US011163883B2

(12) United States Patent
Chen et al.

(10) Patent No.: US 11,163,883 B2
(45) Date of Patent: Nov. 2, 2021

(54) ENHANCING SECURITY OF A TOUCH SCREEN DEVICE

(71) Applicant: International Business Machines Corporation, Armonk, NY (US)

(72) Inventors: Jim C. Chen, Rochester, MN (US); Mariah Nordlund, Rochester, MN (US); Leah R. Temple, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 16/291,894

(22) Filed: Mar. 4, 2019

(65) Prior Publication Data

US 2020/0285745 A1 Sep. 10, 2020

(51) Int. Cl.

| | |
|---|---|
| ***H04L 9/00*** | (2006.01) |
| ***G06F 21/57*** | (2013.01) |
| ***G06F 3/0482*** | (2013.01) |
| ***G06F 3/0481*** | (2013.01) |
| ***G06F 21/84*** | (2013.01) |
| ***G06F 3/0488*** | (2013.01) |

(52) U.S. Cl.

CPC ............ *G06F 21/57* (2013.01); *G06F 3/0482* (2013.01); *G06F 3/0488* (2013.01); *G06F 3/04817* (2013.01); *G06F 21/84* (2013.01); *G06F 2221/031* (2013.01); *G06F 2221/2113* (2013.01)

(58) Field of Classification Search

CPC ............... H04L 63/1458; H04L 47/125; H04L 2463/141

See application file for complete search history.

(56) References Cited

U.S. PATENT DOCUMENTS

| | | | |
|---|---|---|---|
| 9,515,831 B2 | 12/2016 | Lu et al. | |
| 2016/0164865 A1* | 6/2016 | Speicher ............... | H04W 12/08 726/4 |
| 2016/0283710 A1 | 9/2016 | Kwon et al. | |

(Continued)

OTHER PUBLICATIONS

Barsness et al., "Enhancing Security of a Mobile Device Based On Location or Proximity To Another Device", U.S. Appl. No. 15/424,838, filed Feb. 4, 2017.

(Continued)

*Primary Examiner* — Beemnet W Dada

(74) *Attorney, Agent, or Firm* — David B. Woycechowsky

(57) ABSTRACT

A touch screen device includes a security enforcer that monitors the environment of the touch screen device and sets an appropriate security level for the touch screen device based on the monitored environment. The monitored conditions may include users and devices in physical proximity to the touch screen device. When the touch screen device is in physical proximity to users and/or devices the touch screen device does not recognize, the touch screen device elevates its security level. The touch screen device may include a system and application profiles that defines characteristics for enhancing the security of the touch screen device by changing locations of one or more selectable objects for authentication and by changing location of one or more selectable objects for applications based on one or more defined thresholds, or for making an icon unselectable or hidden based on an elevated security level of the touch screen device.

4 Claims, 15 Drawing Sheets

(56) References Cited

U.S. PATENT DOCUMENTS

| | | | | |
|---|---|---|---|---|
| 2017/0091431 | A1* | 3/2017 | Jakobsson | G06F 3/0416 |
| 2017/0142589 | A1* | 5/2017 | Park | H04W 12/086 |
| 2018/0225456 | A1* | 8/2018 | Barsness | G06F 21/35 |

OTHER PUBLICATIONS

Barsness et al., "Enhancing Security of a Mobile Device Based On Location or Proximity To Another Device", U.S. Appl. No. 15/424,841, filed Feb. 4, 2017.

Aviv et al. "Smudge Attacks on Smartphone Touch Screens." Woot 10, 2010.

Von Zezschwitz et al. "Making Graphic-Based Authentication Secure against Smudge Attacks." Proceedings of the 2013 International Conference on Intelligent User Interfaces, ACM, 2013.

De Angeli et al. "VIP: a visual approach to user authentication", Proceedings of the Working Conference on Advanced Visual Interfaces, ACM, 2002.

AIRowaily et al., "Oily Residuals Security threat on Smart phones", 2011 First International Conference on Robot, Vision and Signal Processing (RVSP), IEEE, 2011.

Amruth et al., "Android Smudge Attack Prevention Techniques." Intelligent Systems Technologies and Applications, Springer International Publishing, p. 23-31, 2016.

Souza et al., "Nomadikey: User authentication for smart devices based on nomadic keys", International Journal of Network Management 28.1, 2018.

"Touch Screen Password Guessing by Fingerprint Trace", Information Security, downloaded from the internet on Mar. 29, 2021, 9 pages.

* cited by examiner

| Security Levels of Users and Devices (710) | | |
|---|---|---|
| Known Users | Security Level | Characteristics (720) |
| User A | Medium | |
| User B | Low | |
| User C | High | |
| ⋮ | | |
| User N | Low | |
| Known Devices | Security Level | Characteristics (730) |
| Device A | High | |
| Device B | Low | |
| Device C | Low | |
| ⋮ | | |
| Device N | Medium | |

| Alterations to Rendering of Display Objects | 1110 |
|---|---|
| Move Authentication Object to Different Part of Display – No Overlap | 1120 |
| Move Authentication Object to Different Part of Display – Partial Overlap | 1130 |
| Rearrange Order of Selectable Items on Authentication Object | 1140 |
| Move App Icon to Different Part of Display | 1150 |
| Make App Icon Unselectable | 1160 |
| Resize App Icon | 1170 |
| Hide App Icon | 1180 |
| Hide Authentication Object for Selected App | 1190 |

FIG. 11

| Thresholds | | | 1210 |
|---|---|---|---|
| Security Level | Threshold | Action | |
| Low | 5 | Alter Rendering of Authentication Object | 1220 |
| Low | 10 | Alter Rendering of System Screen | 1230 |
| Medium | 3 | Alter Rendering of Authentication Object | 1240 |
| Medium | 5 | Alter Rendering of System Screen | 1250 |
| High | 0 | Alter Rendering of Authentication Object | 1260 |
| High | 0 | Alter Rendering of System Screen | 1270 |
| High | 0 | Hide Icons for Sensitive Apps | 1280 |

FIG. 12

ENHANCING SECURITY OF A TOUCH SCREEN DEVICE

BACKGROUND

1. Technical Field

This disclosure generally relates to touch screen devices, and more specifically relates to enhancing security of a touch screen device.

2. Background Art

Touch screen devices are typically used by a person pressing on the touch screen with the person's fingertips. A person's fingertips can have a slight oil residue. This is how a person leaves fingerprints on something the person touches. When a user uses a touch screen, the residue on the person's fingertips can result in smudges on the touch screen. It may be possible to infer information, such as an unlock code, based on smudges on a touch screen.

SUMMARY

A touch screen device includes a security enforcer that monitors the environment of the touch screen device and sets an appropriate security level for the touch screen device based on the monitored environment. The monitored conditions may include users and devices in physical proximity to the touch screen device. When the touch screen device is in physical proximity to users and/or devices the touch screen device does not recognize, the touch screen device elevates its security level. The touch screen device may include a system profile that defines characteristics for enhancing the security of the touch screen device by changing locations of one or more selectable objects for authentication, or by changing location of one or more selectable objects for applications (e.g., icons), based on one or more defined thresholds. An application on the touch screen device may include an application profile that defines characteristics for enhancing the security of the touch screen device by changing location of one or more selectable objects for authentication of the application based on one or more defined thresholds, and may additionally include criteria for making an icon for the application unselectable or hidden based on an elevated security level of the touch screen device. By moving selectable objects on the display and by making icons unselectable or hidden, the touch screen device can prevent an unauthorized user from inferring information from smudges on its touch screen and from accessing the touch screen device or applications on the touch screen device.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 11 is a table showing examples of alterations to rendering of display objects;

FIG. 12 is a table showing examples of thresholds for changing rendering of selectable items on a touch screen display;

DETAILED DESCRIPTION

The disclosure and claims herein relate to a touch screen device that includes a security enforcer that monitors the environment of the touch screen device and sets an appropriate security level for the touch screen device based on the monitored environment. The monitored conditions may include users and devices in physical proximity to the touch screen device. When the touch screen device is in physical proximity to users and/or devices the touch screen device does not recognize, the touch screen device elevates its security level. The touch screen device may include a system profile that defines characteristics for enhancing the security of the touch screen device by changing locations of one or more selectable objects for authentication, or by changing location of one or more selectable objects for applications (e.g., icons), based on one or more defined thresholds. An application on the touch screen device may include an application profile that defines characteristics for enhancing the security of the touch screen device by changing location of one or more selectable objects for authentication of the application based on one or more defined thresholds, and may additionally include criteria for making an icon for the application unselectable or hidden based on an elevated security level of the touch screen device. By moving selectable objects on the display and by making icons unselectable or hidden, the touch screen device can prevent an unauthorized user from inferring information from smudges on its touch screen and from accessing the touch screen device or applications on the touch screen device.

Figure 1:
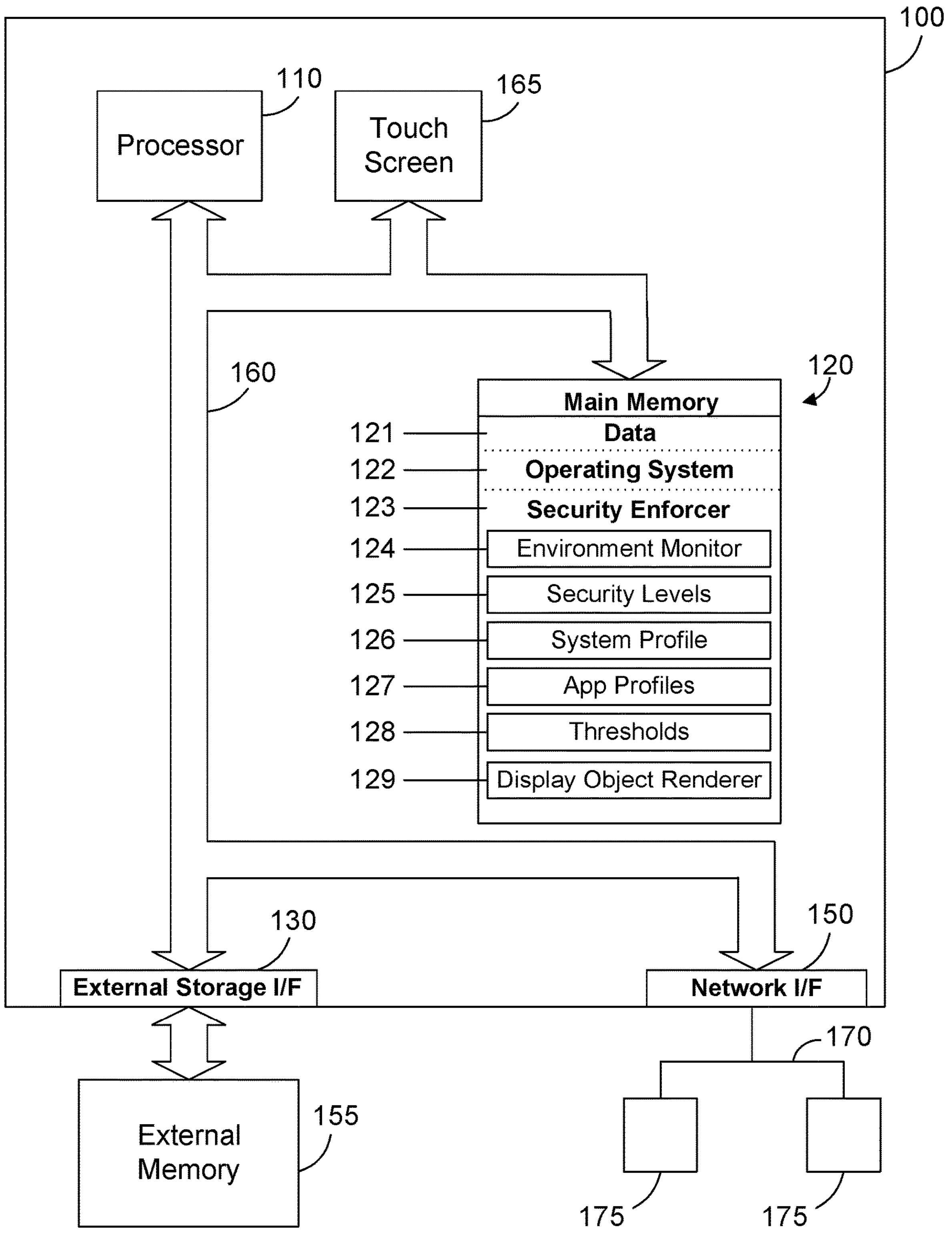
FIG. 1 is a block diagram of a sample touch screen device.

Referring to FIG. 1, a touch screen device 100 represents any suitable type of device that includes a touch screen, including without limitation a smart phone, tablet computer, electronic book reader, notebook computer, laptop computer, desktop computer, gaming console, smart watch, smart TV, security touch pad, smart home device, etc. Those skilled in the art will appreciate that the disclosure herein applies equally to any type of touch screen device. As shown in FIG. 1, one suitable touch screen device 100 comprises one or more processors 110, a main memory 120, an external storage interface 130, a network interface 150, and a touch screen 165. These system components are interconnected through the use of a system bus 160. External storage interface 130 is used to access external memory 155. One specific type of external memory 155 is non-volatile memory on an external device, such as an SD card, a micro-SD card, or a flash drive. The external memory 155 may include any suitable computer readable storage medium as discussed in more detail below.

Main memory 120 preferably contains data 121, an operating system 122 and a security enforcer 123. Data 121 represents any data that serves as input to or output from any program or the operating system 122 in touch screen device 100. Operating system 122 could be any suitable operating system for a touch screen device. Known operating systems for touch screen devices include the iOS operating system developed by Apple Computer, the Android operating system developed by Google, the Windows Phone operating system developed by Microsoft, Windows developed by Microsoft, Linux, AIX, etc. Security enforcer 123 is software that provides security for the touch screen device 100. The security enforcer 123 preferably includes an environment monitor 124, security levels 125, a system profile 126, one or more application profiles 127, one or more thresholds 128, and a display object renderer 129. The environment monitor 124 monitors the environment in physical proximity to the touch screen device, and sets a security level according to the monitored environment. The security levels 125 can include any suitable number of security levels, from two (e.g., low and high) to any number of different security levels as required. The system profile 126 includes information that defines default locations of selectable objects, and thresholds for changing location of one or more selectable objects. Each app profile 127 specifies, for a corresponding software application (or app), default locations of selectable objects, thresholds for changing location of selectable objects, and criteria for making an icon unselectable or hidden. Thresholds 128 define suitable numeric thresholds that determine when the security enforcer takes action to change location of selectable objects, or to hide or make an icon unselectable. Display object renderer 129 renders display objects to the touch screen 165. The security enforcer 123 uses the display object renderer 129 to change location of selectable objects on the touch screen display 165 as disclosed herein.

Main memory 120 may include any suitable combination of different memory types. For example, main memory 120 could include dynamic random access memory (DRAM) that has a relatively small size and a fast access time and could also include non-volatile memory (NVRAM) that has a much larger size and a slower access time. Programs stored in NVRAM could then be loaded into the DRAM in order to be executed by the processor 110. This simple example shows the main memory 120 can include any suitable number and type of memories in any suitable hierarchy, whether currently known or developed in the future.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the security enforcer 123 under the control of the operating system 122. While the security enforcer 123 in FIG. 1 is shown separate from the operating system 122, it is equally within the scope of the disclosure and claims herein to implement the security enforcer 123 within the operating system 122.

Although touch screen device 100 is shown to contain only a single processor and a single system bus, those skilled in the art will appreciate that the security enforcer may be practiced using a touch screen device that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Touch screen 165 is a display that allows the user to select functions on the touch screen device 100 by touching the touch screen 165 and/or by making one or more gestures on the touch screen 165, including a finger swipe and a finger tap. Touch screen 165 may allow a user to interact with any suitable touch sources, including a finger, multiple fingers (including the thumb), and a stylus or other non-finger touch device. Touch screens on touch screen devices are well-known in the art.

Network interface 150 is used to connect touch screen device 100 to a network 170. Network interface 150 broadly represents any suitable way to interconnect electronic devices, such as touch screen device 100, to other devices 175, regardless of whether the network 170 comprises present-day analog and/or digital techniques or via some networking mechanism of the future. Network interface 150 preferably includes a combination of hardware and software that allow communicating on the network 170. The network interface 150 can include multiple different network interfaces. For example, network interface 150 could include a wireless interface for communicating with a 4G network, a Wi-Fi interface for communicating with a Wi-Fi network, and a Bluetooth interface for communicating with other devices via Bluetooth, a Near Field Communication interface, or any other type of suitable network interface, whether currently known or developed in the future. Software in the network interface 150 preferably includes a communication manager that manages communication with other devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
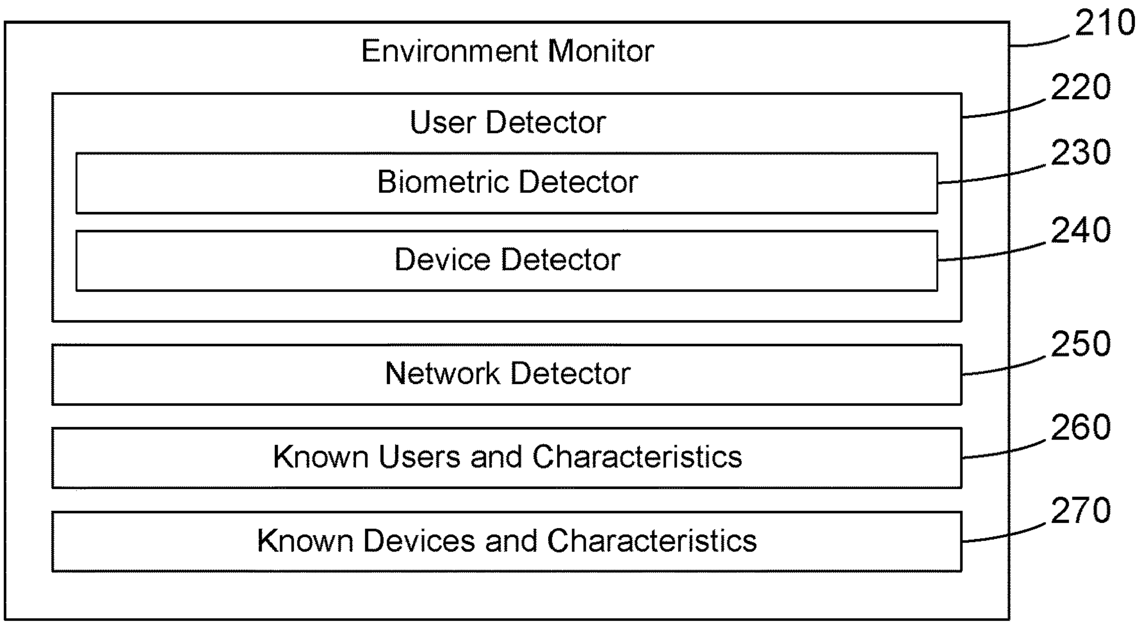
FIG. 2 is a block diagram showing one suitable implementation for the environment monitor shown in FIG. 1.

Referring to FIG. 2, an environment monitor 210 is one suitable embodiment for the environment monitor 124 shown in FIG. 1. Environment monitor 210 includes a user detector 220, a network detector 250, known users and characteristics 260, and known devices and characteristics 270. The user detector 220 can detect a user in any suitable way. For example, user detector 220 may include a biometric detector 230 that detects a user using any suitable biometric identification method, including without limitation facial recognition using a camera on the touch screen device; voiceprint analysis using a microphone on the touch screen device; fingerprint analysis using a fingerprint capture device; retina analysis using a camera on the touch screen device; etc. The user detector 220 may include a device detector 240 that detects a user by detecting a device corresponding to the user that is in physical proximity to the touch screen device. The device detector 240 can detect devices in any suitable way, including without limitation devices within Bluetooth range; devices on a same Wi-Fi network; devices within range of Near Field Communications; etc. When the device detector 240 detects a known device that corresponds to a known user, the environment monitor 210 reports the presence of the known device. When the device detector 240 detects a device that is unknown, and therefore corresponds to an unknown user, the environment monitor 210 reports an unknown user is in physical proximity to the touch screen device. The network detector 250 detects networks that are coupled to the touch screen device, including Bluetooth, Wi-Fi, etc. The device detector 240 can use the network detector 250 to determine what networks are available on the touch screen device. The known users and characteristics 260 includes a log of all known users, with corresponding characteristics for each user. The known devices and characteristics 270 includes a log of all known devices, and which known user corresponds to each known device.

Figure 3:
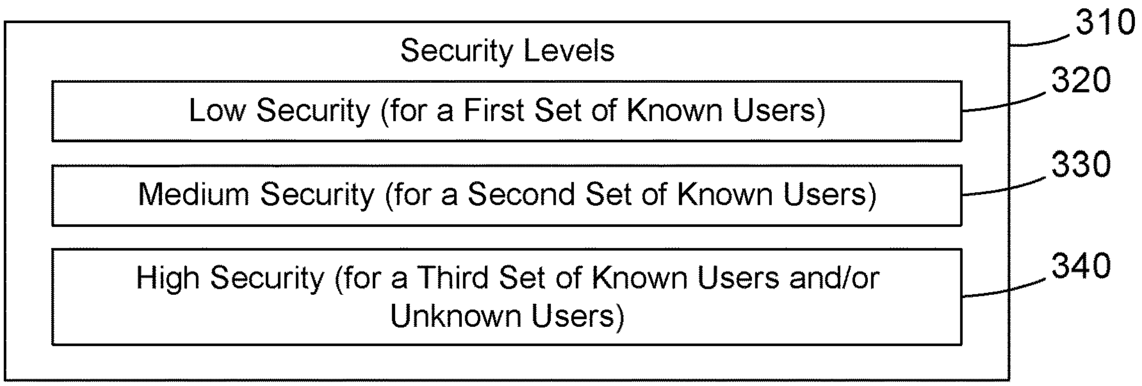
FIG. 3 is a table showing examples of security levels for a touch screen device.

Referring to FIG. 3, security levels 310 are one suitable embodiment for security levels 125 shown in FIG. 1. Security levels 310 include three specified security levels. Note, however, the security levels 125 include any suitable number and type of security levels for the touch screen device. Security levels 310 shown in FIG. 3 includes a low security level 320 for a first set of known users, a medium security level 330 for a second set of known users, and a high security level 340 for a third set of known users and/or for unknown users. By defining three different security levels as shown in FIG. 3, the security enforcer can take action based on a current security level for the touch screen device, as described in more detail below.

Figure 4:
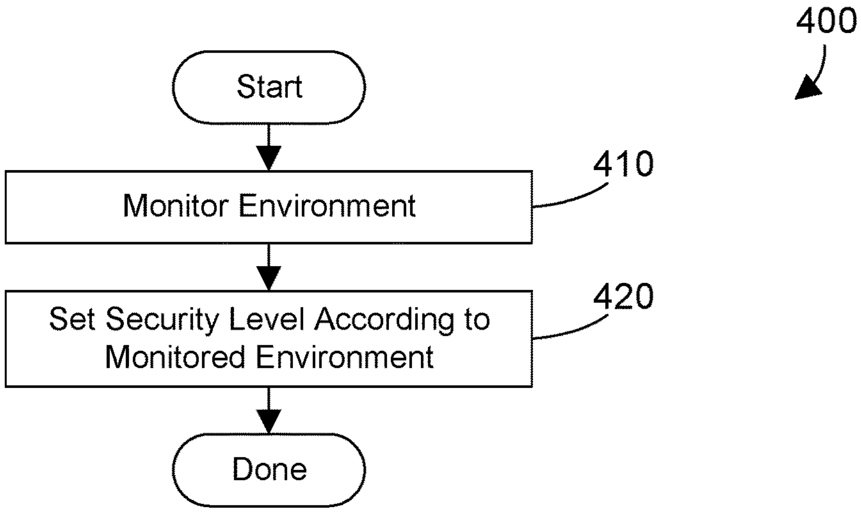
FIG. 4 is a flow diagram of a method for setting a security level for a touch screen device based on the monitored environment.

Referring to FIG. 4, a method 400 is preferably performed by the security enforcer 123 in FIG. 1. The environment in physical proximity to the touch screen device is monitored (step 410), such as by the environment monitor shown in FIGS. 1 and 2. The security level for the touch screen device is then set according to the monitored environment (step 420). The security levels could be selected, for example, from the three security levels shown in FIG. 3. Method 400 is then done.

Figure 5:
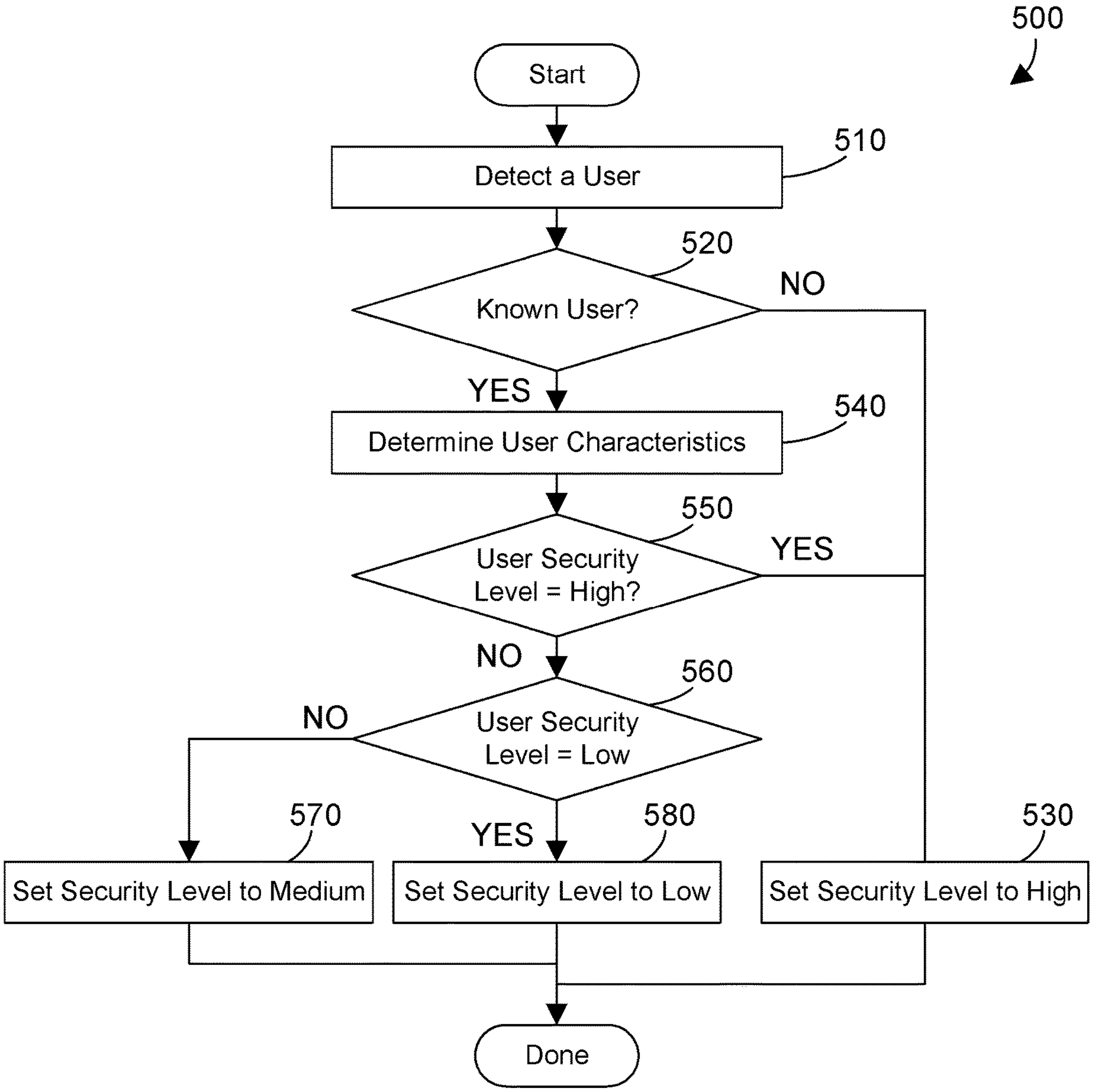
FIG. 5 is a flow diagram of a method for setting a security level of a touch screen device based on detecting a user in physical proximity to the touch screen device.

FIG. 5 shows a flow diagram of a method 500 that is preferably performed by the environment monitor shown in FIGS. 1 and 2. A user is detected (step 510) in physical proximity to the touch screen device. When the detected user is not a known user (step 520=NO), the security level of the touch screen device is set to high (step 530). When the detected user is a known user (step 520=YES), the characteristics corresponding to the user are determined (step 540), such as by querying the known users and characteristics 260 shown in FIG. 2. When the security level for the known user is high (step 550=YES), the security level for the touch screen device is set to high (step 530). When the user security level is not high (step 550=NO), and the user security level is not low (step 560=NO), the security level for the touch screen device is set to medium (step 570). When the user security level is not high (step 550=NO) and is low (step 560=YES), the security level of the touch screen device is set to low (step 580). Method 500 is then done. Note the specific method 500 in FIG. 5 shows the steps when there are three defined security levels as shown in FIG. 3, but one skilled in the art will appreciate how to change method 500 to accommodate additional security levels within the scope of the disclosure and claims herein. Furthermore, method 500 will be repeated for each detected user, and the security level of the device will be set to the highest level for any detected user when multiple users are detected.

Figure 6:
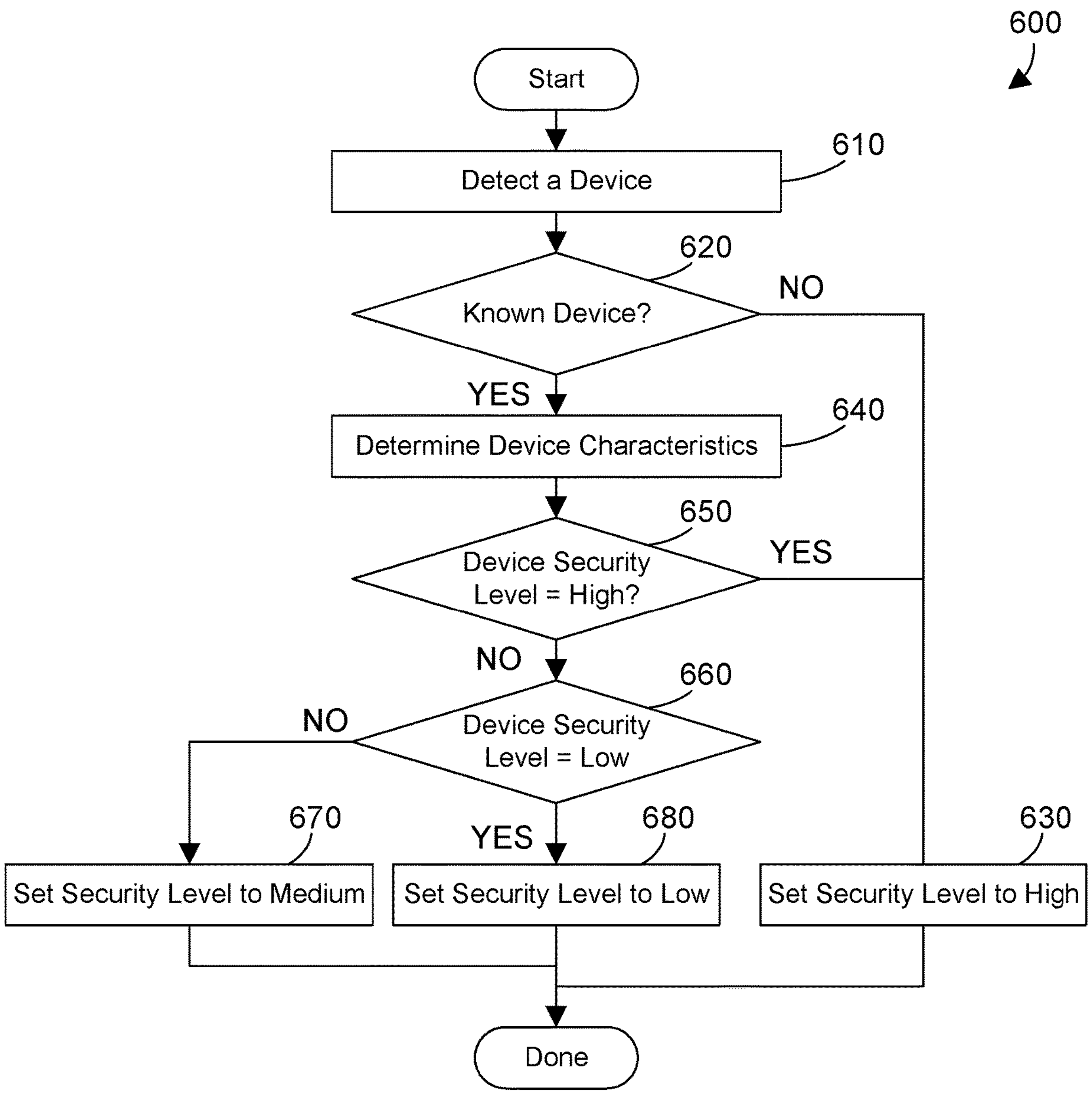
FIG. 6 is a flow diagram of a method for setting a security level of a touch screen device based on detecting a device in physical proximity to the touch screen device.

FIG. 6 shows a flow diagram of a method 600 that is preferably performed by the environment monitor shown in FIGS. 1 and 2. A device is detected (step 610) in physical proximity to the touch screen device. When the detected device is not a known device (step 620=NO), the security level for the touch screen device is set to high (step 630). When the detected device is a known device (step 620=YES), the characteristics corresponding to the device are determined (step 640), such as by querying the known devices and characteristics 270 shown in FIG. 2. When the security level for the known device is high (step 650=YES), the security level for the touch screen device is set to high (step 630). When the device security level is not high (step 650=NO), and the device security level is not low (step 660=NO), the security level for the touch screen device is set to medium (step 670). When the device security level is not high (step 650=NO) and is low (step 660=YES), the security level of the touch screen device is set to low (step 680). Method 600 is then done. Note the specific method 600 in FIG. 6 shows the steps when there are three defined security levels as shown in FIG. 3, but one skilled in the art will appreciate how to change method 600 to accommodate additional security levels within the scope of the disclosure and claims herein. Furthermore, method 600 will be repeated for each detected device, and the security level of the touch screen device will be set to the highest level for any detected device. Thus, if a crowd of people at a party includes twenty people that each have detected devices with a corresponding security level of low, and there is one other person with a detected device that has a corresponding security level of high, the security level of the touch screen device will be set to high.

Figures 7, 8:
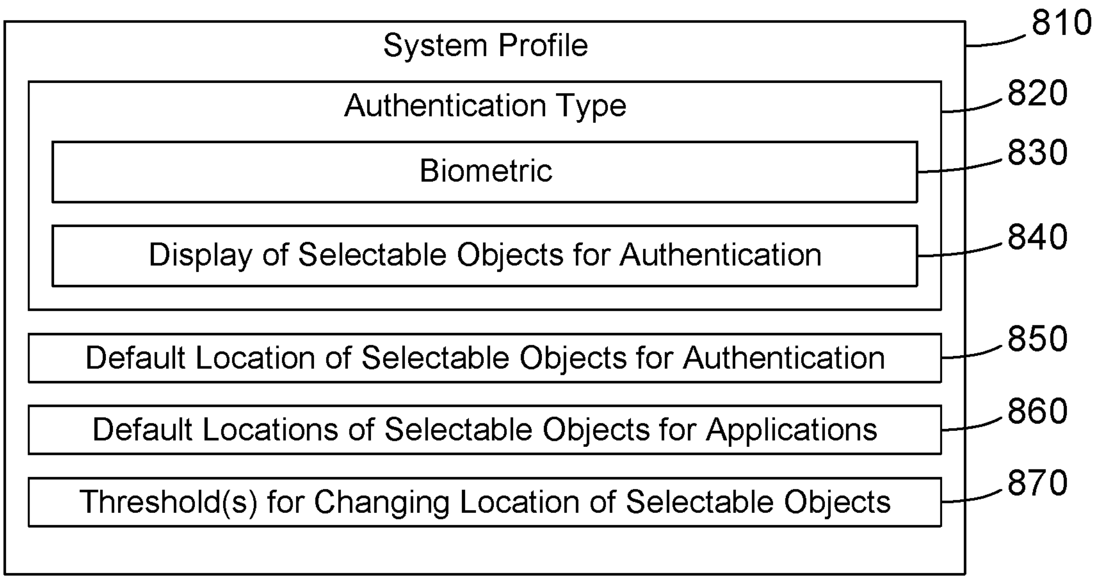
FIG. 7 is a table showing sample security levels for known users and devices.
FIG. 8 is one suitable example for a system profile for a touch screen device.

Referring to FIG. 7, a table 710 includes security levels of users and devices and their associated characteristics. Table 710 includes a first portion 720 for known users and a second portion 730 for known devices. Known users shown in FIG. 7 include User A, User B, User C, . . . , User N. Each user has a corresponding security level, and may include other corresponding characteristics for the user, such as a device used by the user. Thus, User A has a security level of Medium; User B has a security level of Low; User C has a security level of High; and User N has a security level of Low. Similarly, known devices shown in FIG. 7 include Device A, Device B, Device C, . . . , Device N. Each known device has a corresponding security level, and include characteristics that include a known user corresponding to the device and may include other corresponding characteristics for the device. Thus, Device A has a security level of High; Device B has a security level of Low; Device C has a security level of Low; and Device N has a security level of Medium. The characteristics corresponding to the known users and known devices may include any suitable information that corresponds to the users and devices, such as age and gender of a user, type of device, etc.

A system profile 810 shown in FIG. 8 is one suitable example for the system profile 126 shown in FIG. 1. The system profile 810 preferably includes authentication type 820, default location of selectable objects for authentication 850, default locations of selectable objects (such as icons) for applications 860, and one or more thresholds for changing location of selectable objects 870. The authentication type 820 may specify biometric authentication 830 using any suitable known biometric authentication method, including without limitation facial recognition using a camera on the touch screen device; voiceprint analysis using a microphone on the touch screen device; fingerprint analysis using a fingerprint capture device; retina analysis using a camera on the touch screen device; etc. The authentication type 820 may also specify the display of selectable objects for authentication 840. There are many different known selectable objects for authentication, including a numeric keypad used to enter a Personal Identification Number (PIN), a virtual keyboard used to enter a password, an array of nine dots arranged in three rows of three dots that allow a user to enter a graphical connect-the-dot sequence for authentication, and many other known selectable objects for authentication. The disclosure and claims herein expressly extend to using any type of selectable object for authentication, whether currently known or developed in the future.

The default location of selectable objects for authentication 850 specifies a portion of the touch screen display for displaying the selectable objects for authentication. The default location in 850 can be specified in any suitable way, including cartesian or pixel coordinates on the display, a general specification such as "lower left", or any other suitable way to specify a default location for selectable objects for authentication. The default locations of selectable objects for applications 860 preferably specifies where on a system screen the selectable objects for applications, such as icons, are placed. Once again, the default locations of selectable objects for applications 860 can be specified in any suitable way. The threshold(s) for changing location of selectable objects 870 may include numerical thresholds that define when the selectable objects for authentication need to be moved to a different part of the touch screen display and when the selectable objects for applications need to be moved or rearranged on the touch screen display, thereby preventing smudge attacks. The thresholds in 870 may be part of thresholds 128 shown in FIG. 1. Specific examples of numeric thresholds are shown in FIG. 12 for purposes of illustrating one specific example.

Figure 9:
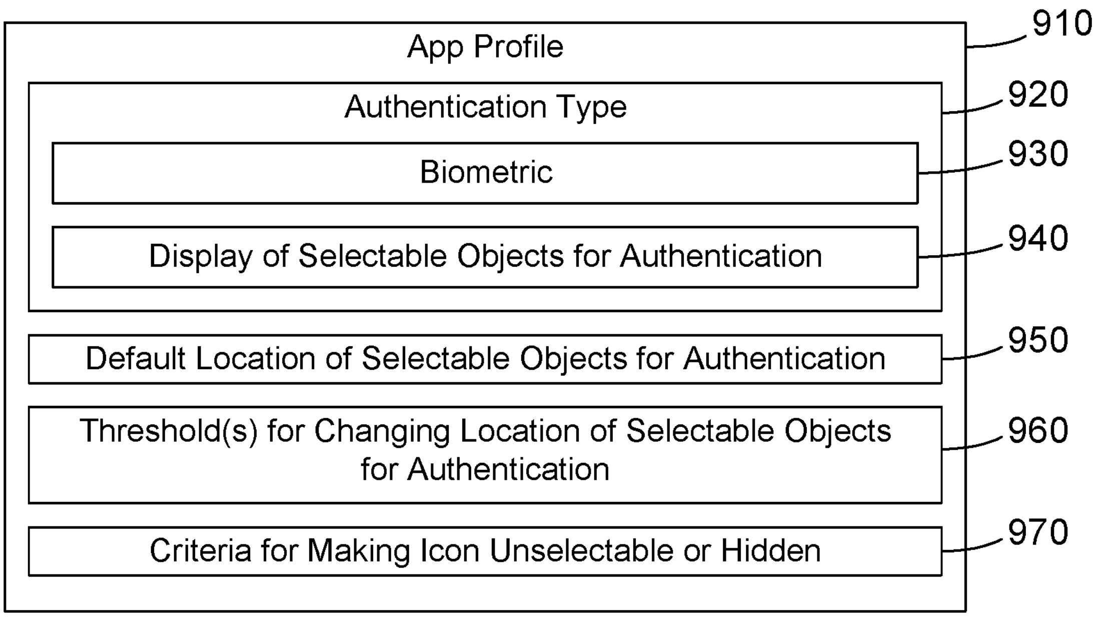
FIG. 9 is one suitable example for an app profile.

In addition to a system profile, each application may have a corresponding profile. A sample app profile 910 is shown in FIG. 9, and is one specific example for one of the app profiles 127 shown in FIG. 1. The app profile 910 preferably includes an authentication type 920, a default location of selectable objects for authentication for the app 950, one or more thresholds for changing location of selectable objects for authentication 960, and criteria for making an icon for the app unselectable or hidden 970. The authentication type 920 may include biometric 930 and the display of selectable objects for authentication, similar to the biometric 830 and display of selectable objects for authentication 840 discussed above. Note, however, the authentication in the app profile 910 is authentication to the app, not to the system, which is specified in the system profile 810 shown in FIG. 8. The default location of selectable objects for authentication 950 specifies a portion of the touch screen display for displaying the selectable objects for authentication to the app. The default location in 950 can be specified in any suitable way, including cartesian or pixel coordinates on the display, a general specification such as "lower left", or any other suitable way to specify a default location for selectable objects for authentication to the app. The threshold(s) for changing location of selectable objects for authentication 960 may include numerical thresholds that define when the selectable objects for authentication to the app need to be moved to a different part of the touch screen display to prevent smudge attacks. The criteria for making an icon unselectable or hidden 970 can specify the icon corresponding to the application be made unselectable or be hidden for certain specified security levels and/or users and/or devices. For example, a banking app could specify to make the icon unselectable when the touch screen device had a medium security level, and to hide the icon for the banking app when the touch screen device has a high security level. Hiding the app icon prevents an unauthorized user from detecting from smudges on the screen a user's use of the banking app.

Figure 10:
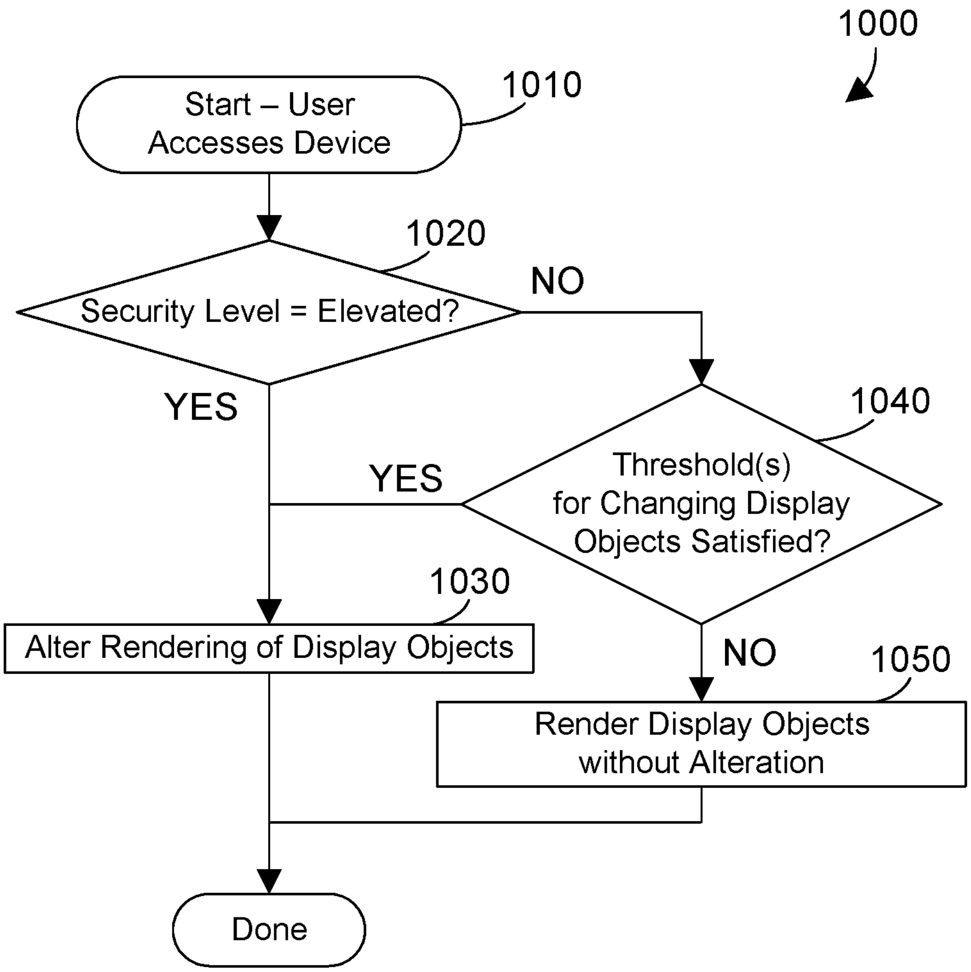
FIG. 10 is a flow diagram of a method for a touch screen device to take action based on a defined security level for the touch screen device.

FIG. 10 shows a method 1000 that is preferably performed by the security enforcer 123 shown in FIG. 1. Method 1000 starts when a user accesses the device (step 1010). When the security level is elevated (step 1020=YES), alter the rendering of display objects (step 1030), such as the system authentication object, an application authentication object, and/or the icons corresponding to the applications. When the security level is not elevated (step 1020=NO), and when one or more of the thresholds for changing display objects is satisfied (step 1040=YES), alter the rendering of display objects (step 1030). When the security level is not elevated (step 1020=NO) and when none of the thresholds for changing the display objects are satisfied (step 1040=NO), the display objects are rendered without alteration (step 1050). Method 1000 is then done. Method 1000 illustrates how the rendering of display objects can be altered under certain conditions to prevent smudge attacks on a touch screen device.

FIG. 11 shows a table 1110 that shows various examples of ways to alter the rendering of display objects. Note the specific alterations listed in table 1110 are shown by way of example, and are not limiting. The disclosure and claims herein extend to any suitable way to alter the rendering of display objects, whether currently known or developed in the future. Sample alterations to the rendering of display objects in FIG. 11 include moving the authentication object to a different part of the display so there is no overlap 1120 between the new location of the authentication object and the default or previous location of the authentication object. Another possible alteration is to move the authentication object to a different part of the display such that the authentication object partially overlaps 1130 the default or previous location of the authentication object. The order of selectable items on an authentication object can be rearranged 1140. An app icon can be moved to a different part of the display 1150. An app icon can be made unselectable 1160. An app icon can be resized 1170. An app icon can be hidden 1180. An authentication object for a selected app can be hidden 1190 so the user is not even presented with the opportunity to try to authenticate to the app.

FIG. 12 shows a table 1210 of thresholds. The thresholds 1210 are suitable examples for thresholds 128 shown in FIG. 1. For this specific example, the thresholds each specify a security level, a numerical threshold, and a corresponding action. Thus, threshold 1220 specifies when the security level is low, after five renderings of the authentication object, the rendering of the authentication object will be altered. Note the "authentication object" could include the system authentication object and any app authentication objects. This could include, for example, one or more of the alterations shown in table 1110 in FIG. 11. Threshold 1230 specifies when the security level is low, after ten renderings of the system screen, the rendering of the system screen will be altered. The system screen referred to here is the screen that displays to the user the selectable items (e.g., icons) for the apps. Threshold 1240 specifies when the security level is medium, after three renderings of the authentication object, the rendering of the authentication object will be altered. Threshold 1250 specifies after five renderings of the system screen, the rendering of the system screen will be altered. Threshold 1260 specifies when the security level is high, the rendering of the authentication object will be altered. Note the numerical threshold is zero, which means for the high security level, the rendering of the authentication object is always altered. This authentication object could be a system authentication object or an app authentication object. Threshold 1270 specifies when the security level is high, the rendering of the system screen is always altered, because the threshold is zero. Threshold 1280 specifies when the security level is high, always hide icons for sensitive apps, because the threshold is zero. Note the term "sensitive apps" refers to apps that have an app profile, such as shown at 910 in FIG. 9, that specifies criteria 970 that specifies to hide the icon when the security level is high.

Figure 13:
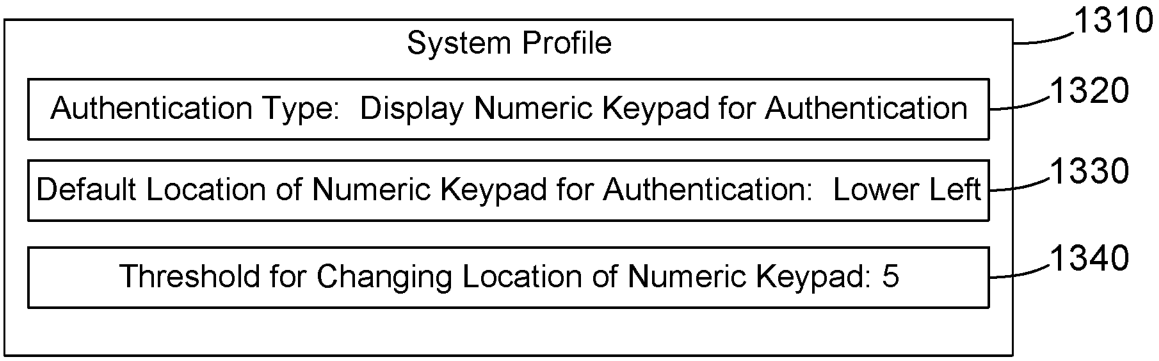
FIG. 13 is an example system profile.
Figure 14:
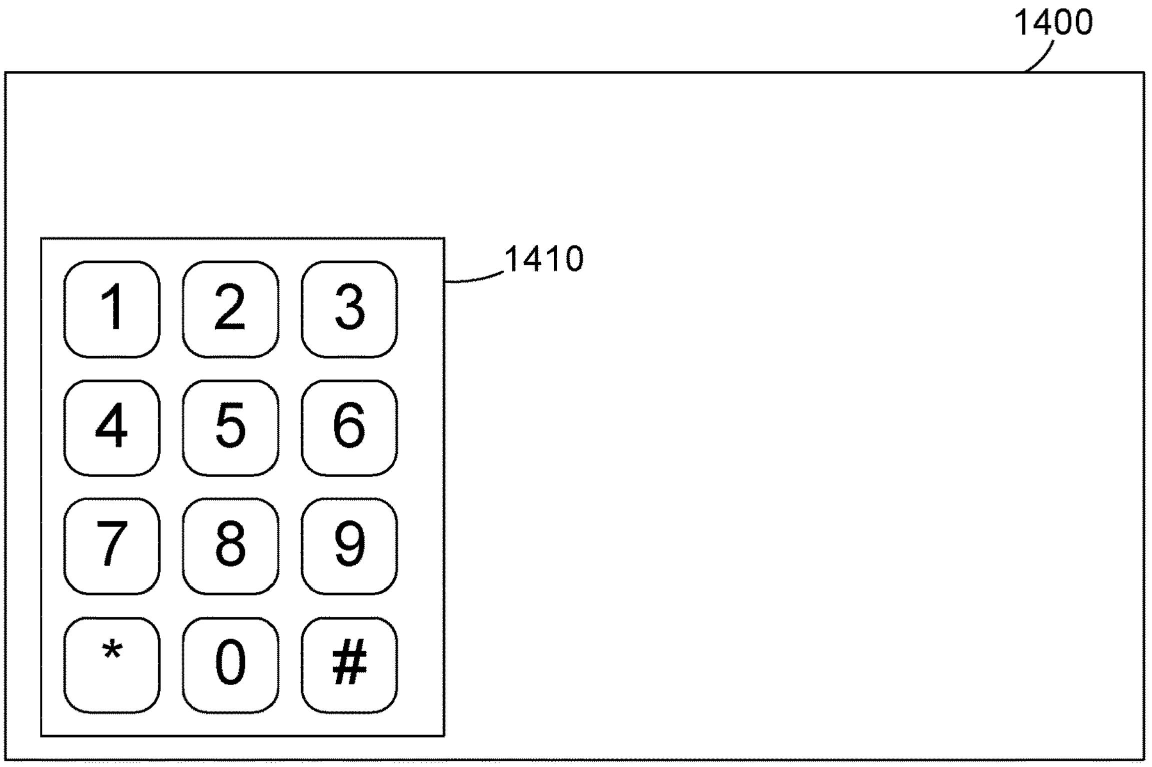
FIG. 14 is a sample display of a touch screen device showing display of an authentication keypad.
Figure 15:
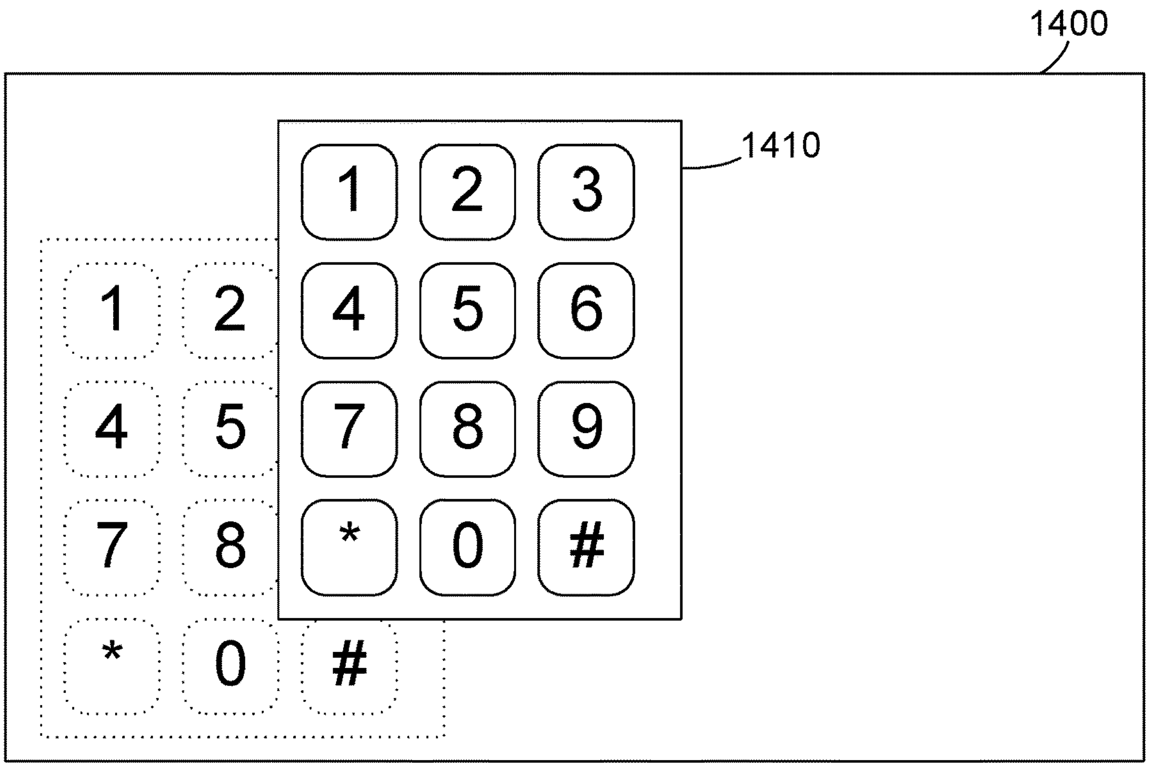
FIG. 15 is a sample display of the touch screen device that shows the authentication keypad has been moved to partially overlap the area where the keypad was previously displayed.

A specific example is now presented to illustrate some of the concepts discussed above. A sample system profile 1310 is shown in FIG. 13. The system profile 1310 specifies an authentication type that displays a numeric keypad for authentication 1320; a default location of the numeric keypad for authentication of lower left at 1330; and a threshold of 5 for changing location of the numeric keypad at 1340. FIG. 14 shows a sample touch screen display 1400 of a touch screen device that includes an authentication object 1410, which for this specific example is a numeric keypad for authentication. Touch screen display 1400 is one suitable example for a display on the touch screen 165 shown in FIG. 1. We assume for this example the first five times the authentication object 1410 is displayed, it is displayed in the lower left corner, as shown in FIG. 14. The sixth time the authentication object 1410 is displayed, the authentication object 1410 is moved to partially overlap the previous lower-left location of the authentication object. To partially overlap the previous location means part of the authentication object 1410 lies within the same area as the previous location while part of the authentication object 1410 lies outside the same area as the previous location. Note the previous location of the authentication object 1410 is shown in FIG. 15 in dotted lines. We note the new location has overlapped the number 4 on the authentication object 1410 with the previous location of the number 3; has overlapped the number 7 with the previous location of the number 6; and has overlapped the * key with the previous location of the number 9. This overlap could be selected to obscure any smudge marks from the earlier location with a new set of smudge marks from using the authentication object 1410 in the new location shown in FIG. 15. The partial overlap shown in FIG. 15 corresponds to the alteration 1130 shown in FIG. 11.

Figure 16:
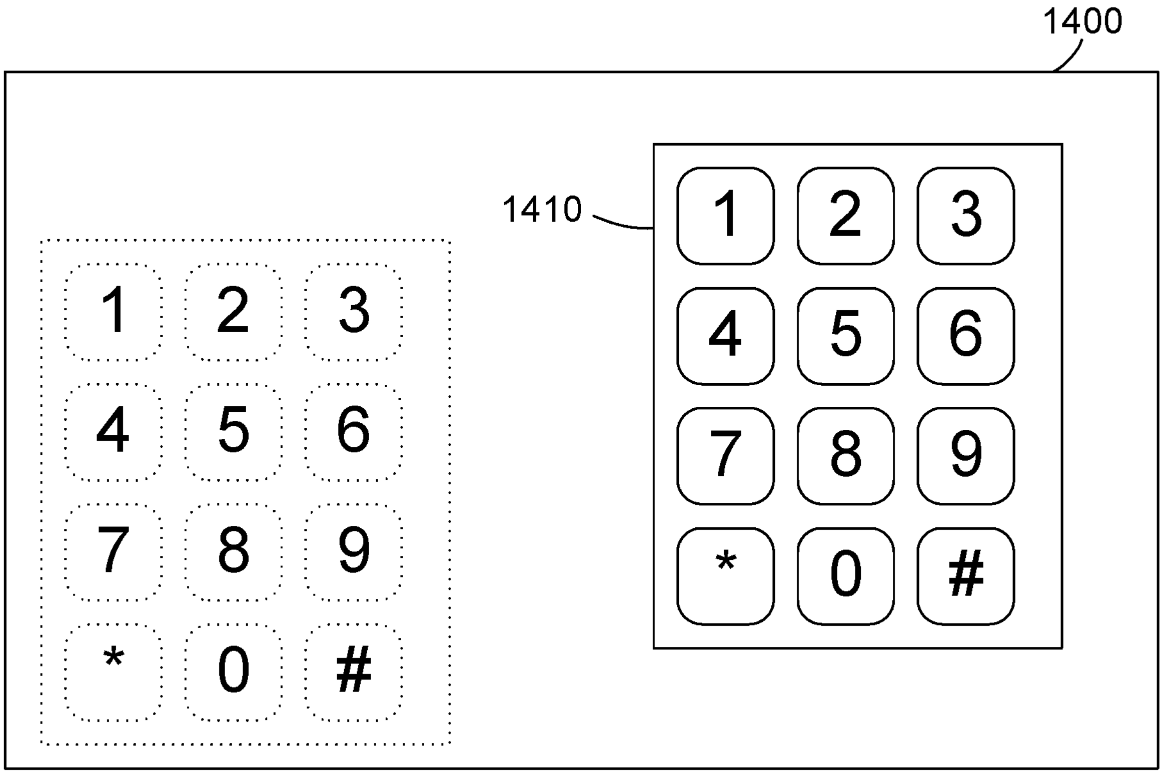
FIG. 16 is a sample display of the touch screen device that shows the authentication keypad has been moved to a new area of the display that does not overlap any of the area where the keypad was previously displayed.
Figure 17:
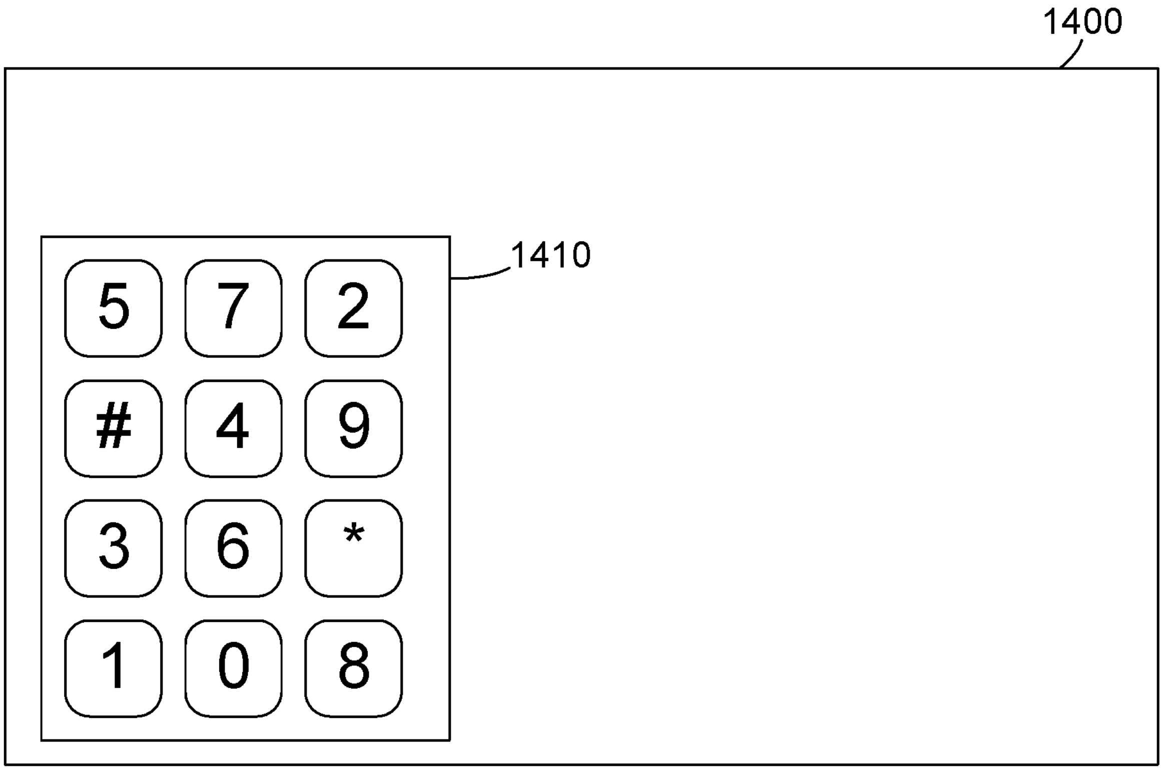
FIG. 17 is a sample display of the touch screen device in FIG. 14 with the items on the keypad rearranged to different positions.

Instead of partially overlapping the authentication object 1410, the authentication object 1410 can be moved to a new area of the display as shown in FIG. 16 that does not overlap any of the previous area shown in dotted lines. The no overlap shown in FIG. 16 corresponds to the alteration 1120 shown in FIG. 11. In another variation, the individual keys on the authentication object 1410 can be rearranged without moving the authentication object, as shown in FIG. 17. By rearranging the keys, when a user enters a PIN on the authentication objects, the smudge marks in the rearranged display in FIG. 17 will not correspond with previous smudge marks. The main threat of smudge marks is allowing a user to infer information from the smudge marks. By rearranging the keys as shown in FIG. 17, the additional smudge marks will make it difficult for an unauthorized user to infer any information from the smudge marks.

Figure 18:
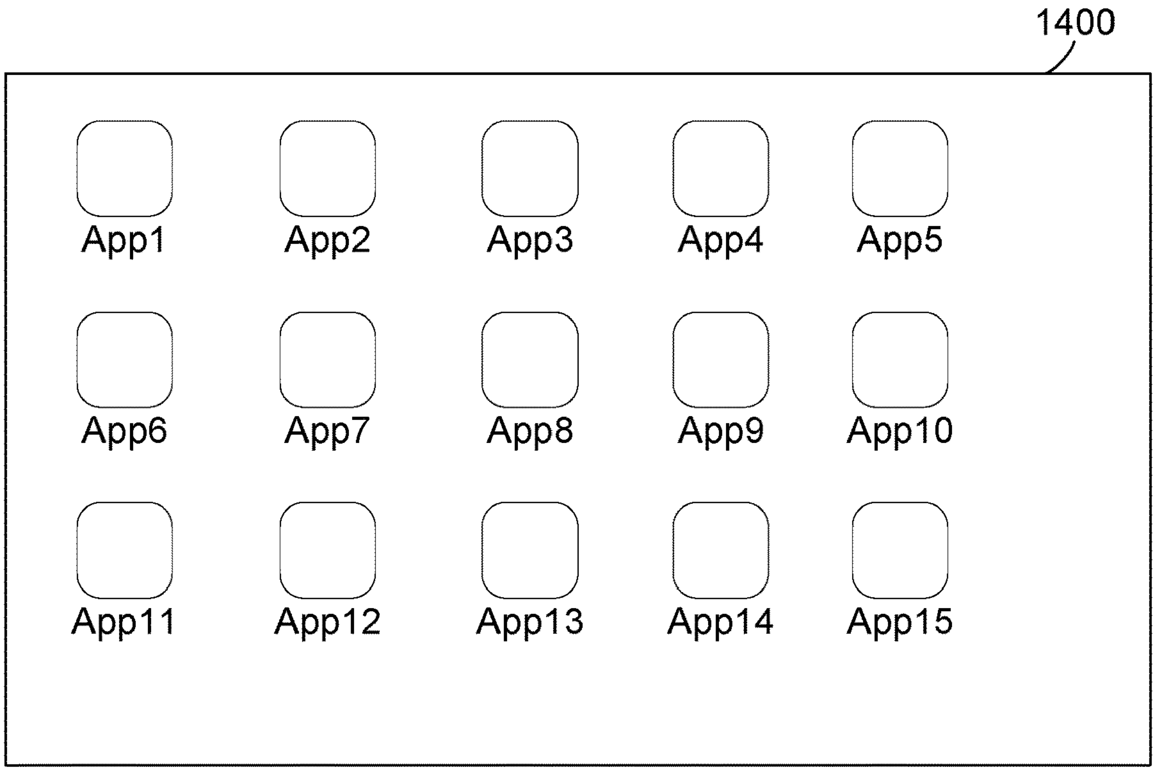
FIG. 18 is a sample display of a system screen that displays selectable icons that correspond to applications.
Figure 19:
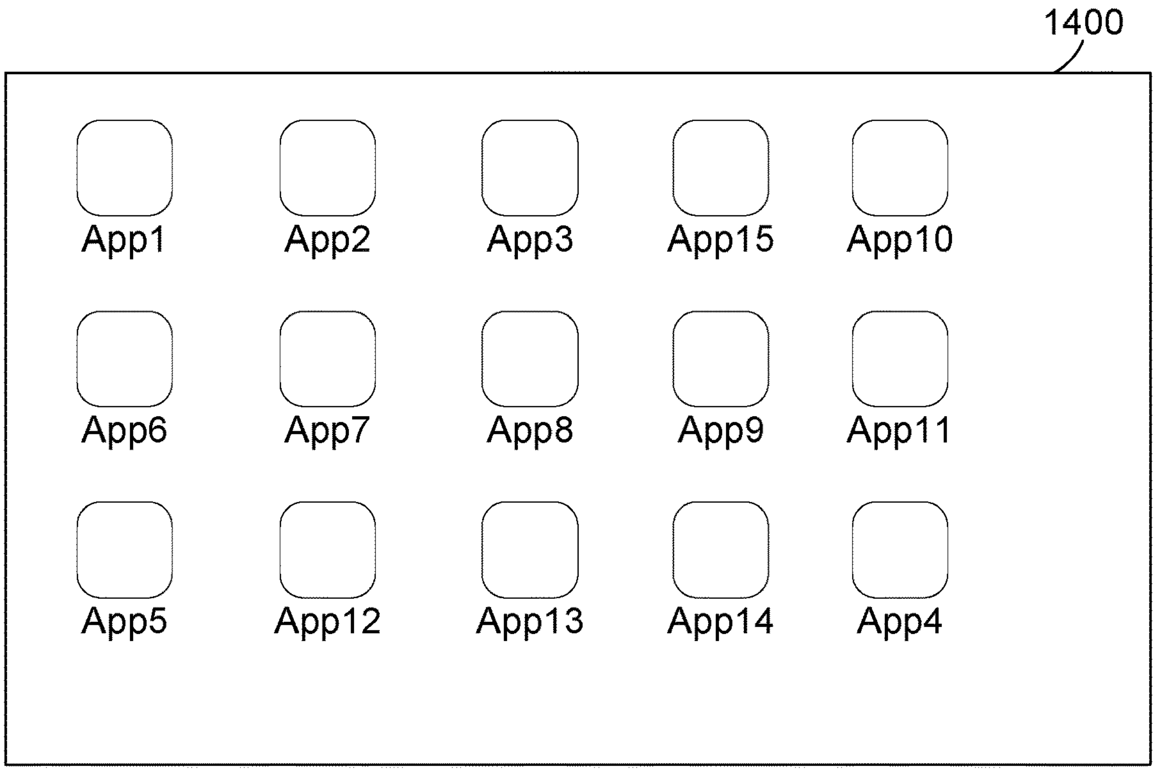
FIG. 19 is a sample display of the system screen in FIG. 18 after some of the selectable icons have been rearranged.
Figure 20:
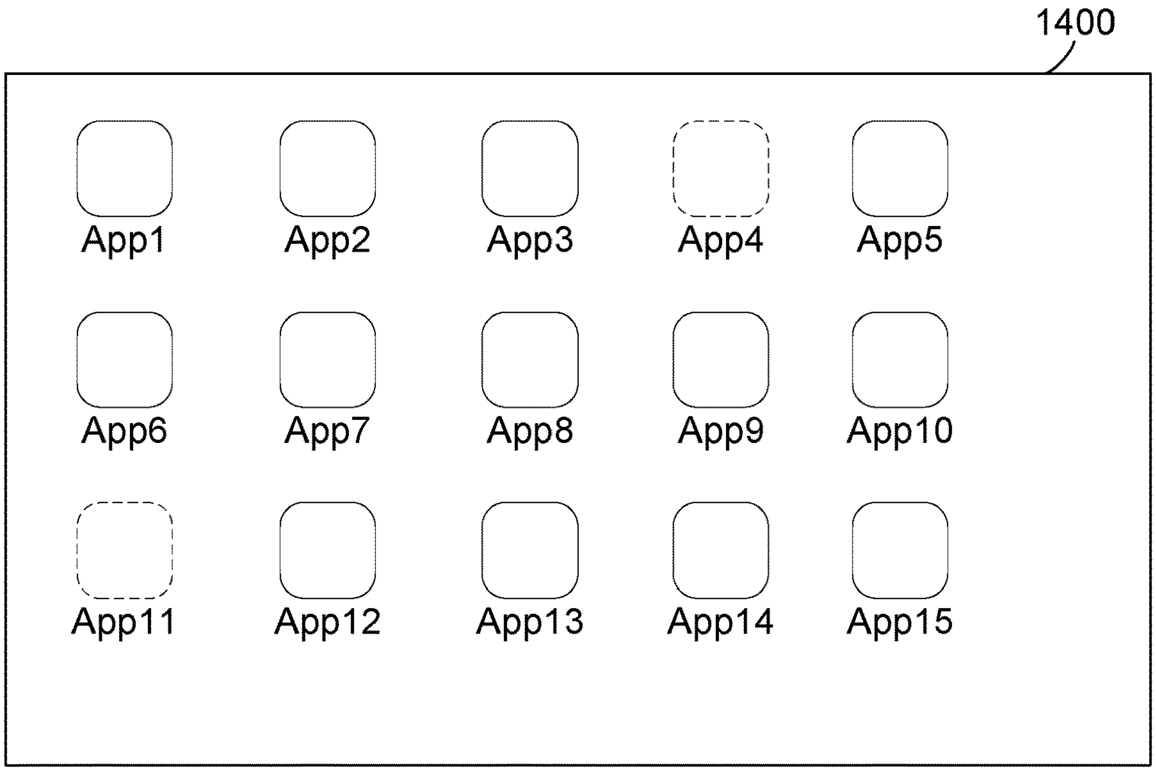
FIG. 20 is a sample display of the system screen in FIG. 18 after the icons for App4 and App11 are made unselectable.
Figure 21:
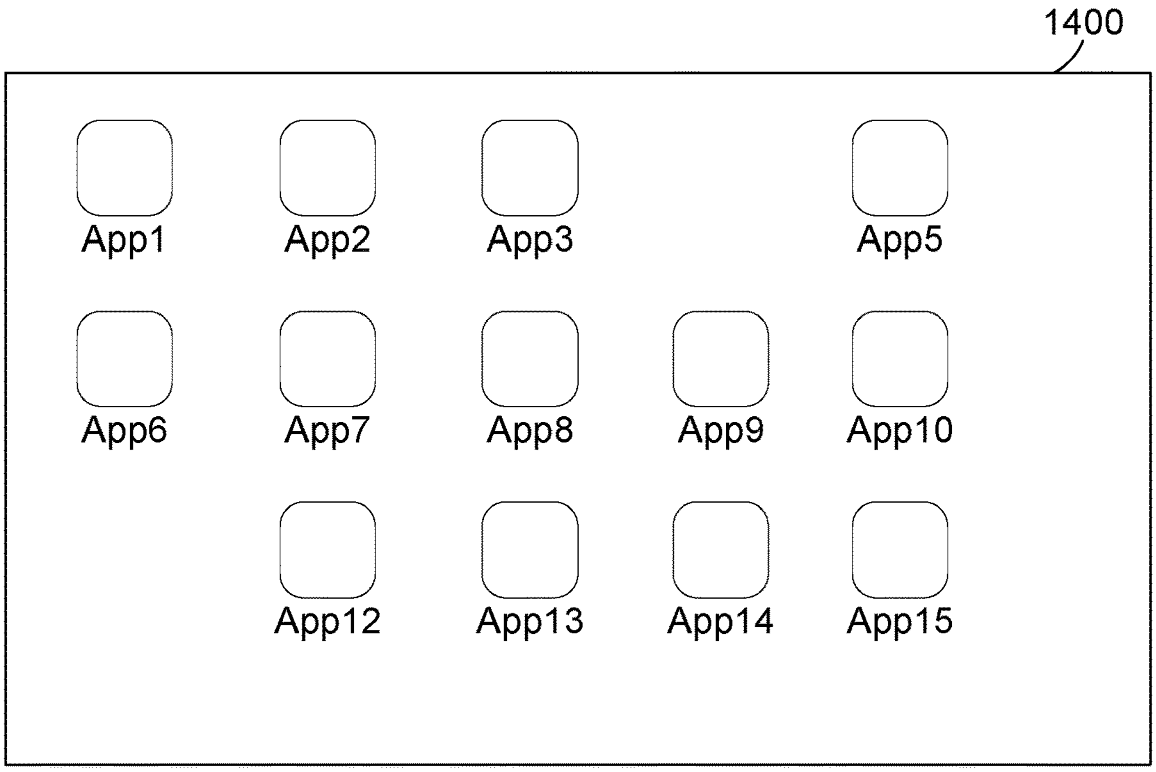
FIG. 21 is a sample display of the system screen in FIG. 18 after the icons for App4 and App11 are hidden.

FIG. 18 shows a sample display of a system screen that includes icons for fifteen different apps, labeled App1 through App15. The icons in FIGS. 18-21 are shown as rounded squares, but one skilled in the art will realize that icons for application typically include graphics and may optionally include text. The representation of icons in FIGS. 18-21 is simplified for the purpose of illustration. We assume the icons are displayed as shown in FIG. 18 for a set number of times depending on security level and thresholds. We assume for this example App4 and App11 are sensitive apps that need more protection than other apps. The app icons can be rearranged as shown in FIG. 19. Note the locations of the icons for App4 and App11 have changed, which will mean a user will not be able to infer from smudge marks the use of App4 and App11. In another variation, App4 and App11 could include an app profile such as shown at 910 in FIG. 9 that includes criteria that specifies the icon is made unselectable when the security level is medium and is hidden when the security level is high. We assume the security level is medium in FIG. 20, resulting in the icons for App4 and App11 still being visible, but are unselectable, as represented in FIG. 20 by these icons being shown in dotted lines. Thus, even when an unauthorized user can detect smudge marks over the App4 and App11 icons, these icons will be unselectable in FIG. 20, thereby preventing an unauthorized user from accessing App4 and App11. If even more security is desired, the icons for App4 and App11 can be hidden completely as shown in FIG. 21, which means any smudge marks in the regions over former locations of App4 and App11 will not give any unauthorized user any information about what apps were accessed at those locations. The display 1400 in FIG. 21 could result, for example, when the security level is high.

Figure 22:
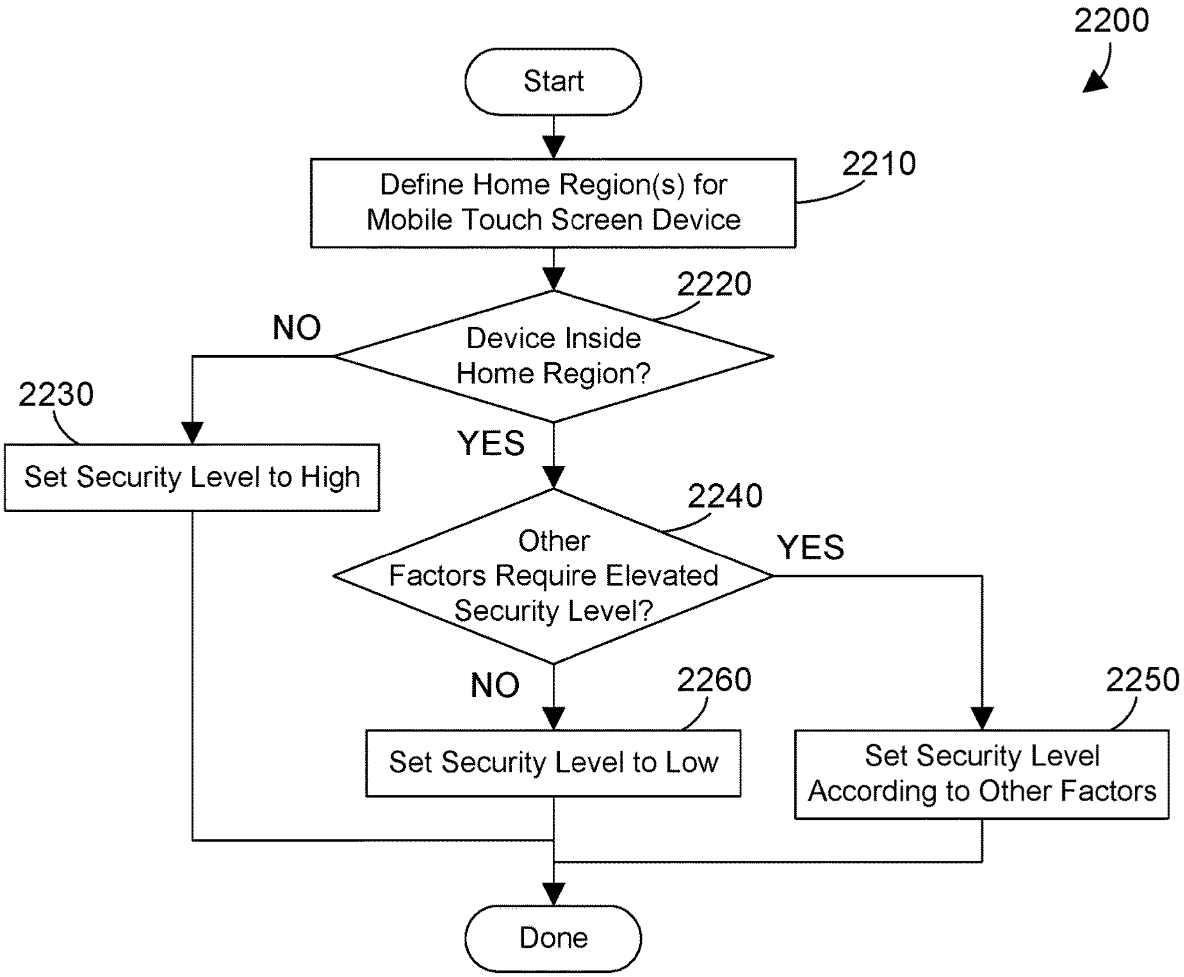
FIG. 22 is a flow diagram of a method for setting a security level for a touch screen device based on whether or not the touch screen device is within or outside a defined home region.

There are other functions that could be performed by the security enforcer 123 in FIG. 1, such as method 2200 in FIG. 22. One or more home regions could be defined for a mobile touch screen device (step 2210). When the device is inside a home region (step 2220=YES), when other factors do not require an elevated security level (step 2240=NO), the security level is set to low (step 2260). When the device is inside a home region (step 2220=YES) and other factors require an elevated security level (step 2240=YES), the security level is set according to the other factors (step 2250). The other factors could include any factors discussed above that require an elevated security level, such as the presence of unknown users or devices, or other factors.

When the device is not inside a home region (step 2220=NO), the security level is set to high (step 2230). Method 2200 is then done.

Figure 23:
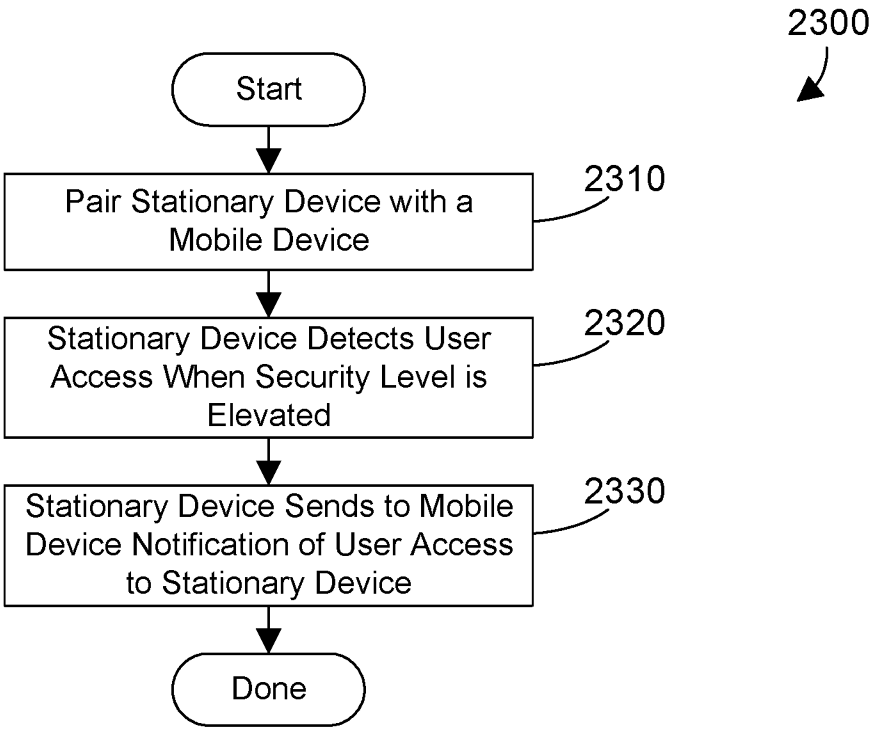
FIG. 23 is a flow diagram of a method for alerting a mobile device when a stationary device is accessed when the security level is elevated.

Method 2300 in FIG. 23 could also be performed by the security enforcer 123 in FIG. 1. A stationary touch screen device is paired to a mobile device (step 2310). Note the term "paired" is not limited to Bluetooth pairing known in the art, but generally means the mobile device and stationary device are identified as a pair such that alerts regarding access to the stationary device can be sent to the mobile device. The stationary device detects user access when the security level is elevated (step 2320). An elevated security level can include any security level higher than the lowest defined security level. Thus, for the three security levels shown in FIG. 3, the medium and high security levels are considered elevated security levels. In response, the security enforcer 123 in the stationary device sends to the paired mobile device a notification of user access to the stationary device (step 2330). Method 2300 is then done. Method 2300 allows a user to receive a notification when a stationary device is being accessed by someone when the stationary device is in an elevated security level.

In another alternative for a paired mobile and stationary device, a user could be working on a stationary touch screen device at a time when the security level is low, and the security level could then be elevated due to a detected user or device in proximity to the stationary touch screen device. In response, the security enforcer could shut down or hide the app the user was using on the stationary device, and launch the same app on the mobile device so the user can complete on the mobile device what the user started on the stationary device.

Figure 24:
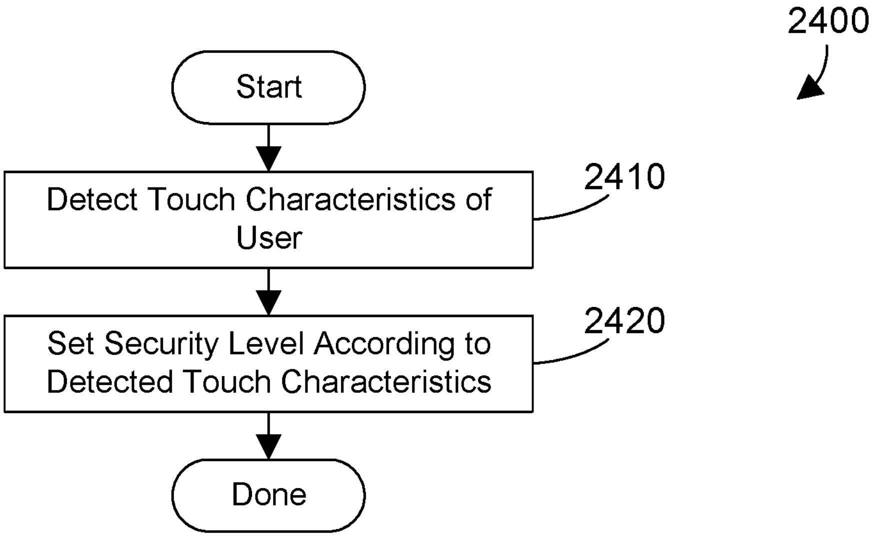
FIG. 24 is a flow diagram of a method for setting a security level of a touch screen device based on detected touch characteristics.

Method 2400 in FIG. 24 could be performed by the environment monitor shown in FIGS. 1 and 2. The touch characteristics of a user are detected (step 2410). The security level of the touch screen device can be set according to the detected touch characteristics (step 2420). Method 2400 is then done. Method 2400 could be useful to detect, for example, use of the touch screen device by children. The touch characteristics of a child in step 2410 can be much different than the touch characteristics of an adult, including speed of touches, and size of the contact area of a finger. Children, even when known, could require an elevated security level (such as medium 330 shown in FIG. 3), which could prevent a child from making purchases or accessing sensitive information on the touch screen device.

Figure 25:
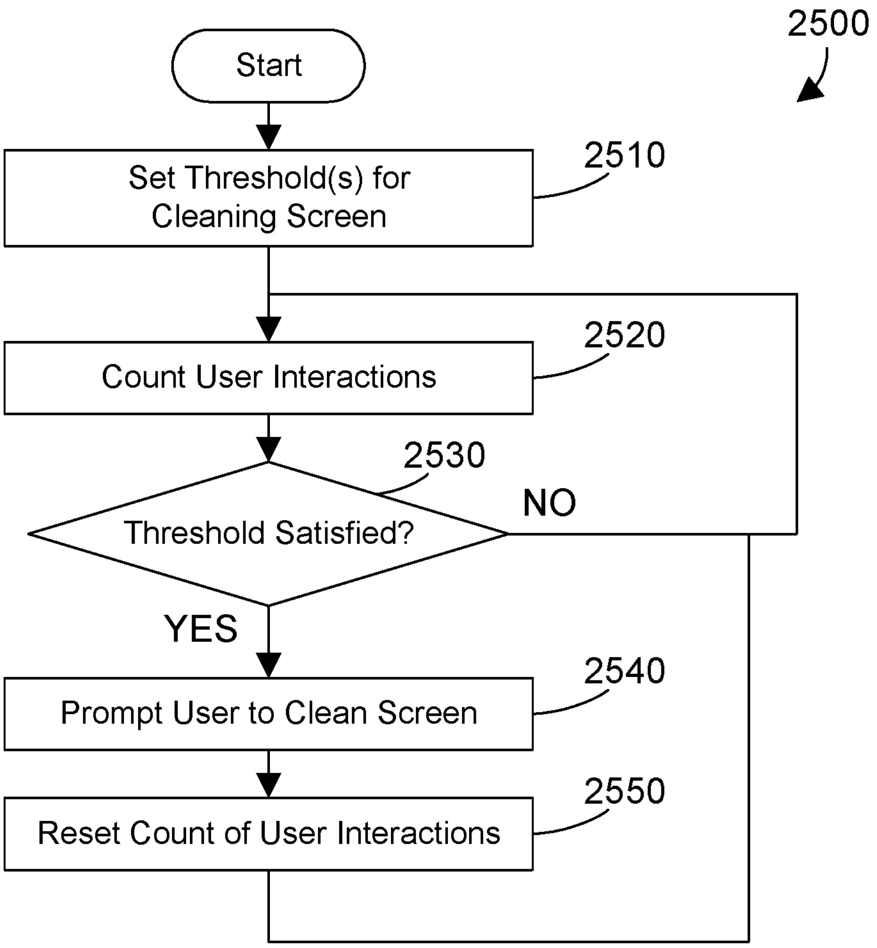
FIG. 25 is a flow diagram of a method for prompting a user to clean a screen on a touch screen device based on a count of user interactions.

Method 2500 in FIG. 25 could be performed by the environment monitor shown in FIGS. 1 and 2. One or more thresholds for cleaning the screen of the touch screen device can be set (step 2510). The user interactions are counted (step 2520). When no threshold is satisfied (step 2530=NO), method loops back to step 2520 and continues to count interactions. When a threshold is satisfied (step 2530=YES), the user is prompted to clean the screen (step 2540), and the count of user interactions is reset (step 2550). Method 2500 then loops back to step 2520 and continues. Periodically prompting the user to clean the screen will help prevent smudge attacks. The thresholds set in step 2510 and the user interactions 2520 can be any suitable threshold and any suitable interaction. For example, thresholds 2510 may specify a number of touches, and user interactions 2520 may include a number of individual touches on the touch screen display by a user. In another example, the thresholds 2510 may specify a number of system authentications, and the user interactions counted in step 2520 will be system authentications by the user. Other thresholds and counted user interactions lie without the scope of the disclosure and claims herein.

The disclosure and claims herein support a touch screen device comprising: a processor; a memory coupled to the processor; a touch screen coupled to the processor that allows a user to interact with a plurality of selectable objects on the touch screen; and a security enforcer residing in the memory and executed by the processor, the security enforcer monitoring an environment of the touch screen device and setting a security level for the touch screen device based on the monitored environment, wherein the security level is selected from a low security level and at least one elevated security level, wherein the security enforcer alters rendering of an authentication object on the touch screen according to the set security level by displaying the authentication object in a second location on the touch screen different than a first location on the touch screen where the authentication object was previously displayed.

The disclosure and claims herein further support a method for providing security for a touch screen device, the method comprising: monitoring an environment of the touch screen device; setting a security level for the touch screen device based on the monitored environment, wherein the security level is selected from a low security level and at least one elevated security level; and altering rendering of an authentication object on the touch screen according to the set security level by displaying the authentication object in a second location on the touch screen different than a first location on the touch screen where the authentication object was previously displayed.

The disclosure and claims herein additionally support a method for providing security for a touch screen device that has a touch screen, the method comprising: defining a system profile that specifies: a default location on the touch screen of selectable objects for system authentication; a default location on the touch screen of selectable objects for applications; and at least one threshold for changing location on the touch screen of the selectable objects based on security level of the touch screen device; defining a plurality of application profiles that each specify, for a corresponding application: a default location on the touch screen of an application authentication object; at least one threshold for changing location on the touch screen of the application authentication object; and criteria for making an icon for the corresponding application unselectable or hidden on the touch screen; monitoring an environment of the touch screen device, wherein the environment comprises detected users and detected devices; setting a security level for the touch screen device based on the monitored environment, wherein the security level is selected from a low security level and at least one elevated security level, wherein the security level is set to one of the at least one elevated security level when the detected users and detected devices include a user or device that is not known to the touch screen device; altering rendering of an authentication object on the touch screen according to the set security level by displaying the authentication object in a second location on the touch screen different than a first location on the touch screen where the authentication object was previously displayed, wherein the second location for the authentication object does not overlap any of the first location for the authentication object; altering rendering of at least one icon corresponding to an application by performing at least one of: changing location on the touch screen of a plurality of icons corresponding to a plurality of applications; and making at least one icon unselectable or hidden on the touch screen; setting a threshold for cleaning the touch screen; counting user interactions with the touch screen; and when a number of the user interactions with the touch screen satisfies the threshold for cleaning the touch screen, prompting a user to clean the touch screen.

A touch screen device includes a security enforcer that monitors the environment of the touch screen device and sets an appropriate security level for the touch screen device based on the monitored environment. The monitored conditions may include users and devices in physical proximity to the touch screen device. When the touch screen device is in physical proximity to users and/or devices the touch screen device does not recognize, the touch screen device elevates its security level. The touch screen device may include a system profile that defines characteristics for enhancing the security of the touch screen device by changing locations of one or more selectable objects for authentication, or by changing location of one or more selectable objects for applications (e.g., icons), based on one or more defined thresholds. An application on the touch screen device may include an application profile that defines characteristics for enhancing the security of the touch screen device by changing location of one or more selectable objects for authentication of the application based on one or more defined thresholds, and may additionally include criteria for making an icon for the application unselectable or hidden based on an elevated security level of the touch screen device. By moving selectable objects on the display and by making icons unselectable or hidden, the touch screen device can prevent an unauthorized user from inferring information from smudges on its touch screen and from accessing the touch screen device or applications on the touch screen device.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A touch screen device comprising:

a processor;

a memory coupled to the processor;

a touch screen coupled to the processor that allows a user to interact with a plurality of selectable objects on the touch screen;

a security enforcer residing in the memory and executed by the processor, the security enforcer monitoring an environment of the touch screen device and setting a security level for the touch screen device based on the monitored environment, wherein the security level is selected from a low security level and at least one elevated security level, wherein the security enforcer alters rendering of an authentication object on the touch screen according to the set security level by displaying the authentication object in a second location on the touch screen different than a first location on the touch screen where the authentication object was previously displayed; and a system profile that specifies:

a default location on the touch screen of selectable objects for system authentication;

a default location on the touch screen of selectable objects for applications; and at least one threshold for changing location on the touch screen of the selectable objects based on security level of the touch screen device.

2. A touch screen device comprising:

a processor;

a memory coupled to the processor;

a touch screen coupled to the processor that allows a user to interact with a plurality of selectable objects on the touch screen;

a security enforcer residing in the memory and executed by the processor, the security enforcer monitoring an environment of the touch screen device and setting a security level for the touch screen device based on the monitored environment, wherein the security level is selected from a low security level and at least one elevated security level, wherein the security enforcer alters rendering of an authentication object on the touch screen according to the set security level by displaying the authentication object in a second location on the touch screen different than a first location on the touch screen where the authentication object was previously displayed; and a plurality of application profiles that each specify, for a corresponding application:

a default location on the touch screen of an application authentication object;

at least one threshold for changing location on the touch screen of the application authentication object; and criteria for making an icon for the corresponding application unselectable or hidden.

3. A method for providing security for a touch screen device, the method comprising:

monitoring an environment of the touch screen device;

setting a security level for the touch screen device based on the monitored environment, wherein the security level is selected from a low security level and at least one elevated security level; and altering rendering of an authentication object on the touch screen according to the set security level by displaying the authentication object in a second location on the touch screen different than a first location on the touch screen where the authentication object was previously displayed;

generating a system profile that specifies:

a default location on the touch screen of selectable objects for system authentication;

a default location on the touch screen of selectable objects for applications; and at least one threshold for changing location on the touch screen of the selectable objects based on security level of the touch screen device.

4. The method of claim 3 further comprising:

a plurality of application profiles that each specify, for a corresponding application:

a default location on the touch screen of an application authentication object;

at least one threshold for changing location on the touch screen of the application authentication object; and criteria for making an icon for the corresponding application unselectable or hidden on the touch screen.

* * * * *